United States Patent
Bleier et al.

(10) Patent No.: US 10,274,620 B2
(45) Date of Patent: Apr. 30, 2019

(54) SYSTEM AND METHOD FOR PROVIDING SHORT-TERM EARTHQUAKE FORECASTS

(71) Applicant: STELLAR SOLUTIONS, INC., Palo Alto, CA (US)

(72) Inventors: Thomas Bleier, Portola Valley, CA (US); Karl Kappler, Palo Alto, CA (US); John Doering, San Jose, CA (US); Laura MacLean, Hayward, CA (US); Dan Schneider, San Jose, CA (US); James Lemon, San Francisco, CA (US); Dan Coughlin, Santa Cruz, CA (US)

(73) Assignee: STELLAR SOLUTIONS, INC., Palo Alto, CA (US)

( * ) Notice: Subject to any disclaimer, the term of this patent is extended or adjusted under 35 U.S.C. 154(b) by 78 days.

(21) Appl. No.: 15/466,677

(22) Filed: Mar. 22, 2017

(65) Prior Publication Data
US 2018/0275295 A1  Sep. 27, 2018

(51) Int. Cl.
| | |
|---|---|
| *G01V 1/00* | (2006.01) |
| *G01V 1/18* | (2006.01) |
| *G01V 1/24* | (2006.01) |
| *G01V 1/30* | (2006.01) |
| *G06K 9/00* | (2006.01) |

(Continued)

(52) U.S. Cl.
CPC .............. *G01V 1/008* (2013.01); *G01V 1/189* (2013.01); *G01V 1/24* (2013.01); *G01V 1/30* (2013.01); *G06K 9/0051* (2013.01); *G06K 9/0055* (2013.01); *G06K 9/40* (2013.01);
(Continued)

(58) Field of Classification Search
CPC . G01V 1/189; G01V 1/24; G01V 1/30; G01V 1/008; G06K 9/0051; G06K 9/00536; G06K 9/0063; G06K 9/40; G06K 9/6202
See application file for complete search history.

(56) References Cited

U.S. PATENT DOCUMENTS

| | | |
|---|---|---|
| 6,873,265 B2 | 3/2005 | Bleier |
| 2015/0051837 A1* | 2/2015 | Kelley ............... G01V 1/28 702/3 |

OTHER PUBLICATIONS

Naaman, Sh., et al., "Comparison of simultaneous variations of the ionospheric total electron content and geomagnetic field associated with strong earthquakes," Natural Hazards and Earth System Sciences (2001) 1: 53-59.

(Continued)

*Primary Examiner* — Bryan Bui
(74) *Attorney, Agent, or Firm* — Squire Patton Boggs (US) LLP

(57) ABSTRACT

A system for predicting occurrence of earthquakes greater than magnitude 4.5 within 24-48 hours includes a plurality of sensor stations in communication with a data center. The sensor stations collect data from three induction magnetometers, two ion detectors (positive and negative), a geophone, and temperature and humidity sensors. Infrared data for the area around the station is also collected and evaluated at the data center. Other sensors may be deployed to detect, identify, and eliminate signals that are attributed to noise. Noise sources may include solar storms, lightning, vehicles, electric trains, and other local machinery or man-made sources. Using the captured data, the data center applies signal-processing algorithms to identify patterns in the collected data that match known data patterns which have immediately preceded earthquakes.

18 Claims, 12 Drawing Sheets

(51) Int. Cl.
    *G06K 9/40*     (2006.01)
    *G06K 9/62*     (2006.01)
    *H04L 29/08*     (2006.01)

(52) U.S. Cl.
    CPC ............ *G06K 9/6247* (2013.01); *H04L 67/12* (2013.01); *Y04S 40/18* (2018.05)

(56) References Cited

OTHER PUBLICATIONS

Park, Stephen K., et al., "Electromagnetic Precursors to Earthquakes in The ULF Band: A Review of Observations and Mechanisms," Reviews of Geophysics, 31, May 2, 1993, pp. 117-132. Paper No. 93RG00820.

Parrot, Michel, "Statistical study of ELF/VLF emissions recorded by a low-altitude satellite during seismic events," Journal of Geophysical Research, vol. 99, No. A12, pp. 23,339-23,347, Dec. 1, 1994, Laboratoire de Physique at Chimie de l'Environment.

Porrat, Dana et al., "Propagation at Extremely Low Frequencies," STAR Laboratory, Stanford University Feb. 2003.

Pulinets., S.A., et al., "Correlation analysis technique revealing ionospheric precursors of earthquakes," Natural Hazards and Earth System Sciences (2004) 4: 697-702 SRef-ID: 1684-9981/nhess/2004-4-697.

Pulinets., Sergev, "Natural Radioactivity, Earthquakes, and the Ionosphere," EOS, vol. 88, No. 20, May 15, 2007.

Shvets, A.V., et al., "Results of subionospheric radio LF monitoring prior to the Tokachi (M=8, Hokkaido, Sep. 25, 2003) earthquake," Natural Hazards and Earth System Sciences (2004) 4: 647-653 SRef-ID: 1684-9981/nhess/2004-4-647.

St-Laurent, France, et al., "Earthquake Lights and the Stress-Activation of Positive Hole Charge Carriers in Rocks."

Surkov, V.V., et al., "A direction finding technique for the ULF electromagnetic source," Natural Hazards and Earth System Sciences (2004) 4: 513-517 SRef-ID: 1684-9981/nhess/2004-4-513.

Ziesolieck, C.W.S., et al., "A comparison between Pc 3-4 pulsations observed by GOES 7 and the CANOPUS magnetometer array," Journal of Geophysical Research, vol. 102, No. A3, pp. 4893-4909, Mar. 1, 1997.

Berkman, Rikhard, et al., "New Approach To The Exact Design of Low Noise Search-Coil Magnetometers," Lviv Centre of Institute of Space Research of National Academy of Sciences and National Space Agency, Lviv, Ukraine.

Bernardi, A., et al., "An Automatic Real-Time Geomagnetic Activity Monitoring System for the MAD and Adjacent Frequency Bands," STARLAB, Department of Electrical Engineering / SEL, Stanford University, Stanford, CA 94305, Nov. 1988.

Biagi, P.F., et al., "VLF-ELF radio signals collected at Bari (South Italy): a preliminary analysis on signal anomalies associated with earthquakes," Natural Hazards and Earth System Sciences (2004) 4: 685-689, SRef-ID: 1684-9981/nhess/2004-4-685.

Bleier, T., et al., "Correlation of pre-earthquake electromagnetic signals with laboratory and field rock experiments," Nat. Hazards Earth Syst. Sci., 10, 1965-1975, 2010 www.nat-hazards-earth-syst-sci.net/10/1965/2010/.

Bleier, T., et al., "Investigation of ULF magnetic pulsations, air conductivity changes, and infra red signatures associated with the Oct. 30 Alum Rock M5.4 earthquake," Nat. Hazards Earth Syst. Sci., 9, 585-603, 2009.

Bortnik, J, et al., "The possible statistical relation of Pc1 pulsations to Earthquake, occurrence at low latitudes." Manuscript prepared for Ann. Geophys.with version 1.3 of the LATEX class copernicus. cls.Date: Jul. 4, 2008.

Bortnik, J. et al., "An automatic wave detection algorithm applied to Pc1 pulsations," J. Geophys. Res., 112, A04204, doi:10.1029/2006JA011900. (2007).

Bortnik, J. et al., "Characteristics of low-latitude Pc1 pulsations during geomagnetic storms" J. Geophys. Res., 113, A04201, doi:10.1029/2007JA012867.(2008).

Bortnik, J., et al., "Estimating the seismotelluric current required for observable electromagnetic ground signals," Ann. Geophys., 28, 1615-1624, 2010 /28/1615/2010/ doi:10.5194/angeo-28/1615-2010.

Cervone, G., et al., "Wavelet maxima curves of surface latent heat flux anomalies associated with Indian earthquakes," Natural Hazards and Earth System Sciences (2005) 5: 87-99 SRef-ID: 1684-9981/nhess/2005-5-87.

Cornilleau-Wehrlin, N., et al., "First results obtained by the Cluster STAFF experiment," Annales Geophysicae (2003) 21: 437-456c European Geosciences Union 2003.

Corrado, R., et al., "Seismically active area monitoring by robust TIR satellite techniques: a sensitivity analysis on low magnitude earthquakes in Greece and Turkey," Natural Hazards and Earth System Sciences (2005) 5: 101-108 SRef-ID: 1684-9981/nhess/2005-5-101.

Cutler, J., et al., "CalMagNet—an array of search coil magnetometers monitoring ultra low frequency activity in California" Nat. Hazards Earth Syst. Sci., 8, 359-368, 2008.

Dautermann, T, et al., "Investigation of ionospheric electron content variations before earthquakes in southern California," 2003-2004, J. Geophys. Res., 112, B02106, doi:10.1029/2006JB004447. (2007).

Dunson, J.C. et al., "The Pulse Azimuth effect as seen in induction coil magnetometers located in California and Peru 2007-2010, and its possible association with earthquakes," Nat. Hazards Earth Syst. Sci., 11, 1-21, 2011 www.nat-hazards-earth-syst-sci.net/11/1/2011/ doi:10.5194/nhess-11-1-2011.

Egbert, Gary D., "On the Generation of ULF Magnetic Variations by Conductivity Fluctuations in a Fault Zone", Abstract, Pureappl. geophys.159, 2002, pp. 1205-1227, Gary D. Egbert.

Egbert, Gary D., et al., "DC Trains and Pc3s: Source effects in mid-latitude geomagnetic transfer functions" Geophysical Research Letters, vol. 27, No. 1, pp. 25-28, Jan. 1, 2000.

Fenoglio M.A., et al., "Comparison of Ultra-Low Frequency Electromagnetic Signals with Aftershock Activity During the 1989 Loma Prieta Earthquake Sequence," Bulletin of the Seismological Society of America, vol. 83, No. 2, pp. 347-357, Apr. 1993.

Flagg, Scott, "Using Nanosats as a Proof of Concept for Space Science Missions: QuakeSat as an Operational Example," in Proceedings of the 18th Annual/USU Conference on Small Satellites, Logan, Utah, Aug. 2004.

Fraser-Smith, A.C., "Ultralow-Frequency Magnetic Fields Preceding Large Earthquakes," Eos, vol. 89, No. 23, Jun. 3, 2008.

Fraser-Smith, A.C., et al., "Low-Frequency Magnetic Field Measurements near the Epicenter of the Ms7.1 Loma Prieta Earthquake" Geophysical Research Letters, vol. 17, No. 9, pp. 1465-1468, Aug. 1990.

Fraser-Smith, Antony c., et al., "Reception of ELF Signals at Antipodal Distances," STAR Laboratory, Stanford University, Stanford, CA 94305.

Freund, F.T., et al, "Positive Holes and their Role during the Build-up of Stress prior to the Chi-Chi Earthquake," International Conference—in Commemoration of 5th Anniversary of the Chi-Chi Earthquake Taipei, Taiwan, Sep. 8-12, 2004.

Freund, F.T., et al., "Stimulated Thermal IR Emission from Rocks: Assessing a Stress Indicator," submission date Sep. 10, 2005.

Freund, F.T., et al., "Stress-Induced Changes in the Electrical Conductivity of Igneous Rocks and the Generation of Ground Currents," TAO, vol. 15, No. 3, Sep. 2004.

Freund., F.T., et al., "Cracking the Code of Pre-Earthquake Low Frequency EM Emissions".

Hadjicontis, V., et al., "Stress induced polarization currents and electromagnetic emission from rocks and ionic crystals, accompanying their deformation," Natural Hazards and Earth System Sciences (2004) 4: 633-639 SRef-ID: 1684-9981/nhess/2004-4-633.

Hayakawa, M., et al., "Monitoring of ULF (ultra-low frequency) Geomagnetic Veriations Associated with Earthquakes," Sensors, 2007, 7, 1108-1122.

Ismaguilov, V.S., et al., "ULF magnetic emissions connected with under sea bottom earthquakes," Natural Hazards and Earth System Sciences (2001) 1: 23-31.

(56) References Cited

OTHER PUBLICATIONS

Ismaguilov, V.S., et al., "Variations of phase velocity and gradient values of ULF geomagnetic disturbances connected with the Izu strong earthquakes," Natural Hazards and Earth System Sciences (2003) 3: 211-215.

Johnston, M.J.S., et al., "Seismomagnetic Effects from the Long-Awaited Sep. 28, 2004 M 6.0 Parkfield Earthquake," Bulletin of the Seismological Society of America, vol. 96, No. 4B, pp. S206-S220, Sep. 2006.

Johnston, Malcolm J.S. (ed), "The Loma Prieta, California, Earthquake of Oct. 17, 1989—Pre-seismic Observations," U.S. Geological Survey Professional Paper 1550-C.

Jordan, Thomas H., "Earthquake Predictability, Brick by Brick," Seismological Research Letters Jan./Feb. 2006, Southern California Earthquake Center University of Southern California Los Angeles, CA 90089-0742.

Kamogawa, M., "Preseismic Lithosphere-Atmosphere—Ionosphere Coupling," EOS, vol. 87, No. 40, Oct. 3, 2006.

Karakelian, Darcy, et al., "A Transportable System for Monitoring Ultra Low Frequency Electromagnetic Signals Associated with Earthquakes," Seismological Research Letters vol. 71, No. 4, 423-436.

Karakelian, Darcy, et al., "Analysis of Ultralow-Frequency Electromagnetic Field Measurements Associated with the 1999 M 7.1 Hector Mine, California, Earthquake Sequence," Bulletin of the Seismological Society of America, vol. 92, No. 4, pp. 1513-1524, May 2002.

Karakkelian, Darcy, et al., "Results From Electromagnetic Monitoring of the Mw5.1 San Juan Bautista, California Earthquake of Aug. 12, 1998," Department of Geophysics, Stanford University, Stanford, CA 94305-2215.

Konstantaras, A., et al., "A neuro-fuzzy approach to the reliable recognition of electric earthquake precursors," Natural Hazards and Earth System Sciences (2004) 4: 641-646 SRef-ID: 1684-9981/nhess/2004-4-641.

Kotsarenko, A., et al., "Analysis of the ULF electromagnetic emission related to seismic activity," Teoloyucan geomagnetic station, 1998-2001, Natural Hazards and Earth System Sciences (2004) 4: 679-684 SRef-ID: 1684-9981/nhess/2004-4-679.

Kotsarenko, A., et al., "Investigation of ULF magnetic anomaly during Izu earthquake swarm and Miyakejima volcano eruption at summer 2000, Japan," Natural Hazards and Earth System Sciences (2005) 5: 63-69 SRef-ID: 1684-9981/nhess/2005-5-63.

Kotsareno, A., et al., "Analysis of the ULF electromagnetic emission related to seismic activity Teoloyucan geomagnetic station, 1998-2001," Natural Hazards and Earth System Sciences (2004) 4: 679-684.

Kushwah, Vinod K., et al., "Initial results of ultra low frequency magnetic field observations at Agra and their relation with seismic activities," Current Science, vol. 87, No. 3, Aug. 10, 2004.

Long, Matthew, et al., "A CubeSat Derived Design for a unique Academic Research Mission in Earthquake Signature Detection," in Proceedings of the 16th Annual/USU Conference on Small Satellites, Logan, Utah, Aug. 2002.

Losseva, T.V., et al., "Earthquake lights and rupture processes," Natural Hazards and Earth System Sciences, 5, 649-656, 2005.

Molchanov, O., et al., "Lithosphere-atmosphere-ionosphere coupling as governing mechanism for preseismic short-term events in atmosphere and ionosphere," Natural Hazards and Earth System Sciences (2004) 4: 757-767 SRef-ID: 1684-9981/nhess/2004-4-757.

Molchanov, O., et al., "Near-seismic effects in ULF fields and seismo-acoustic emission: statistics and explanation," Natural Hazards and Earth System Sciences (2005) 5: 1-10 SRef-ID: 1684-9981/nhess/2005-5-1.

Molchanov, O., et al., "Pre-seismic ULF electromagnetic effect from observation at Kamchatka," Natural Hazards and Earth System Sciences (2003) 3: 203-209.

Bernardi, A., et al., "An Automatic Real-Time Geomagnetic Activity Monitoring System for the MAD and Adjacent Frequency Bands," STARLAB, Department of Electrical Engineering / SEL, Stanford University, Stanford, CA 94305.

Bleier, T., et al., "Investigation of ULF magnetic pulsations, air conductivity changes, and infra red signatures associated with the Oct. 30 Alum Rock M5.A earthquake," Nat. Hazards Earth Syst. Sci., 9, 585-603, 2009.

Freund, F.T., et al., "Stimulated Thermal IR Emission from Rocks: Assessing a Stress Indicator."

* cited by examiner

FIG. 1  QuakeFinder Station
100

200   Magnetometer Amplifier-Filter

Geophone Amplifier-Filter

300

400

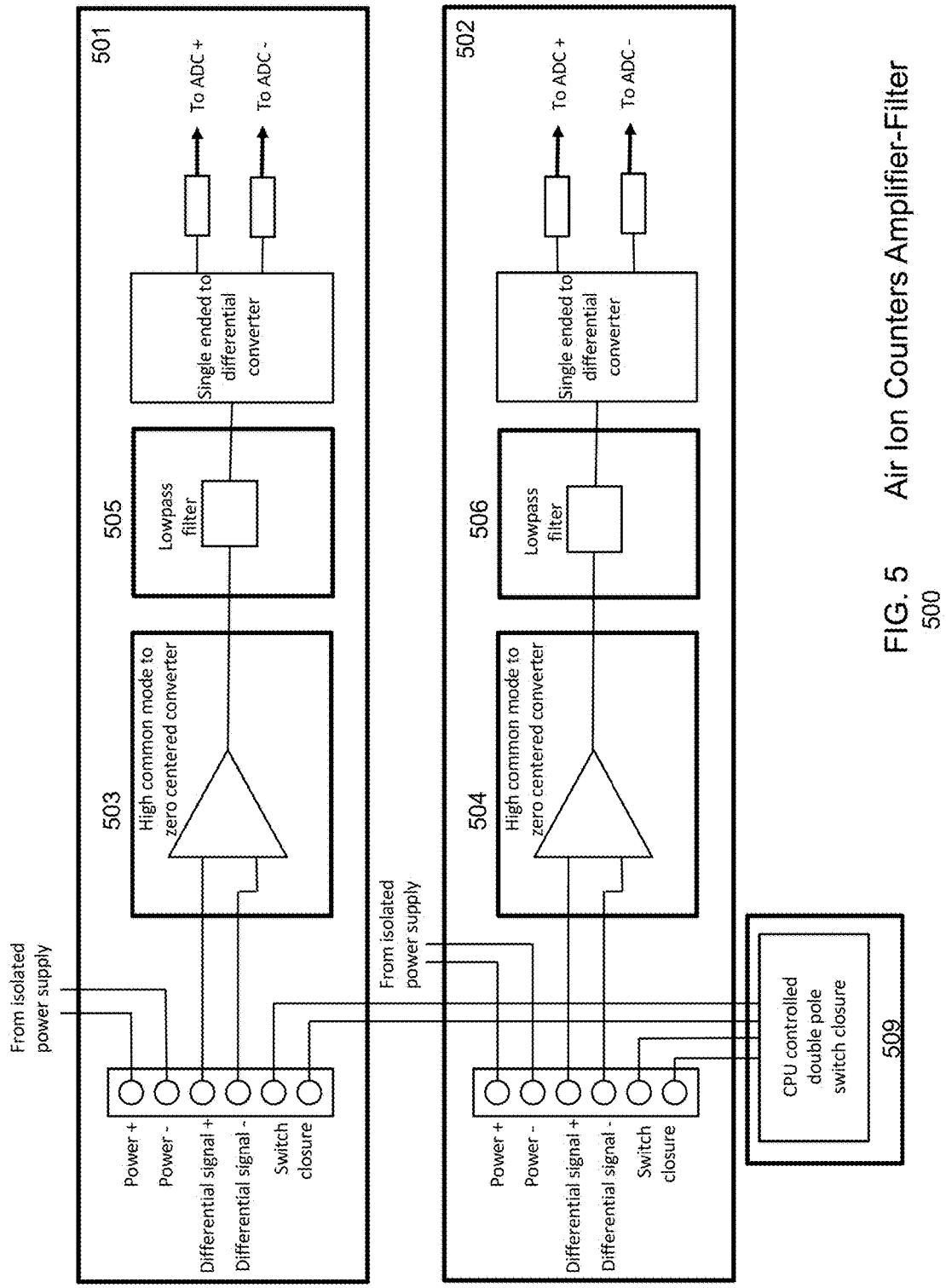
FIG. 5    Air Ion Counters Amplifier-Filter
500

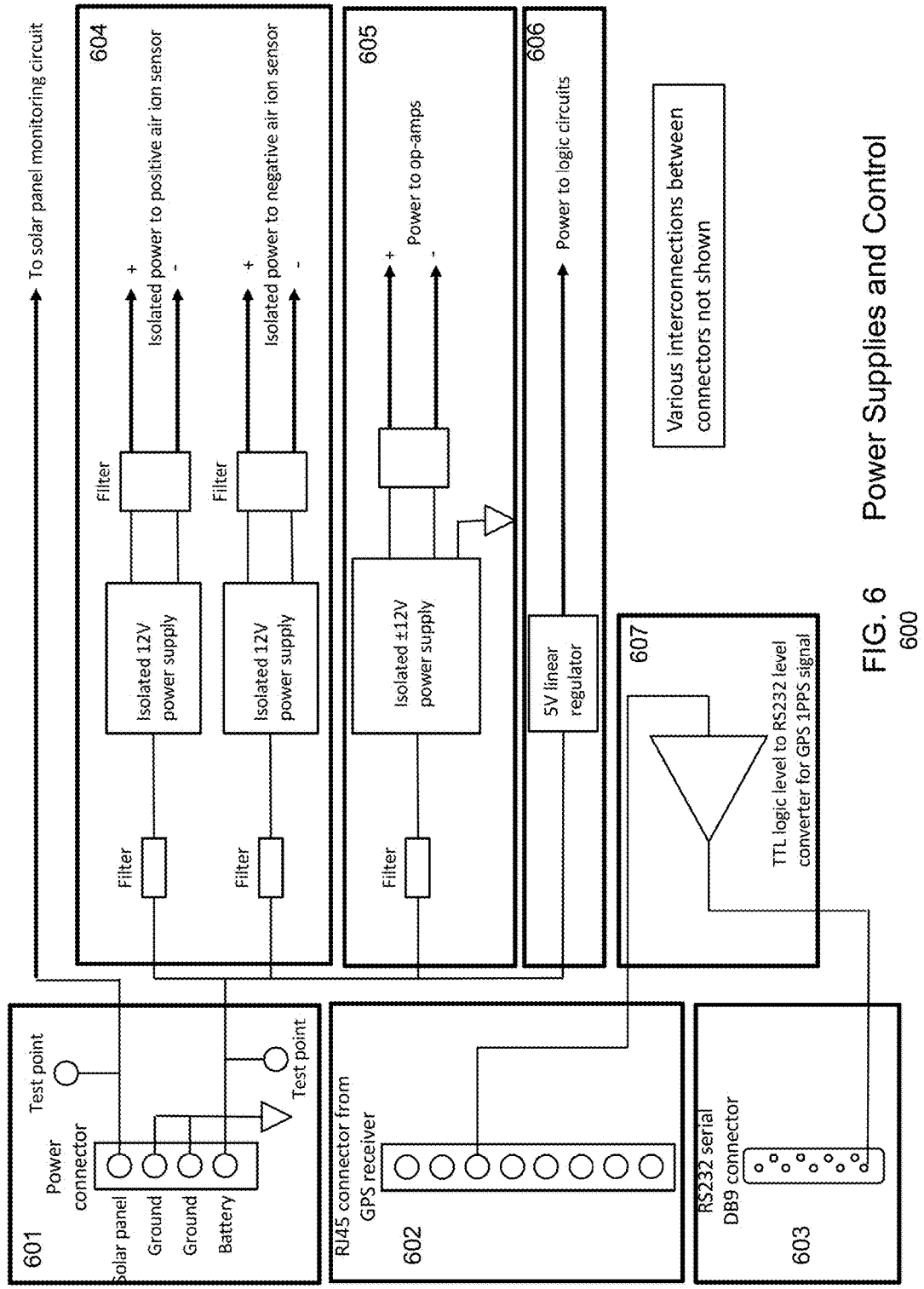
FIG. 6   Power Supplies and Control

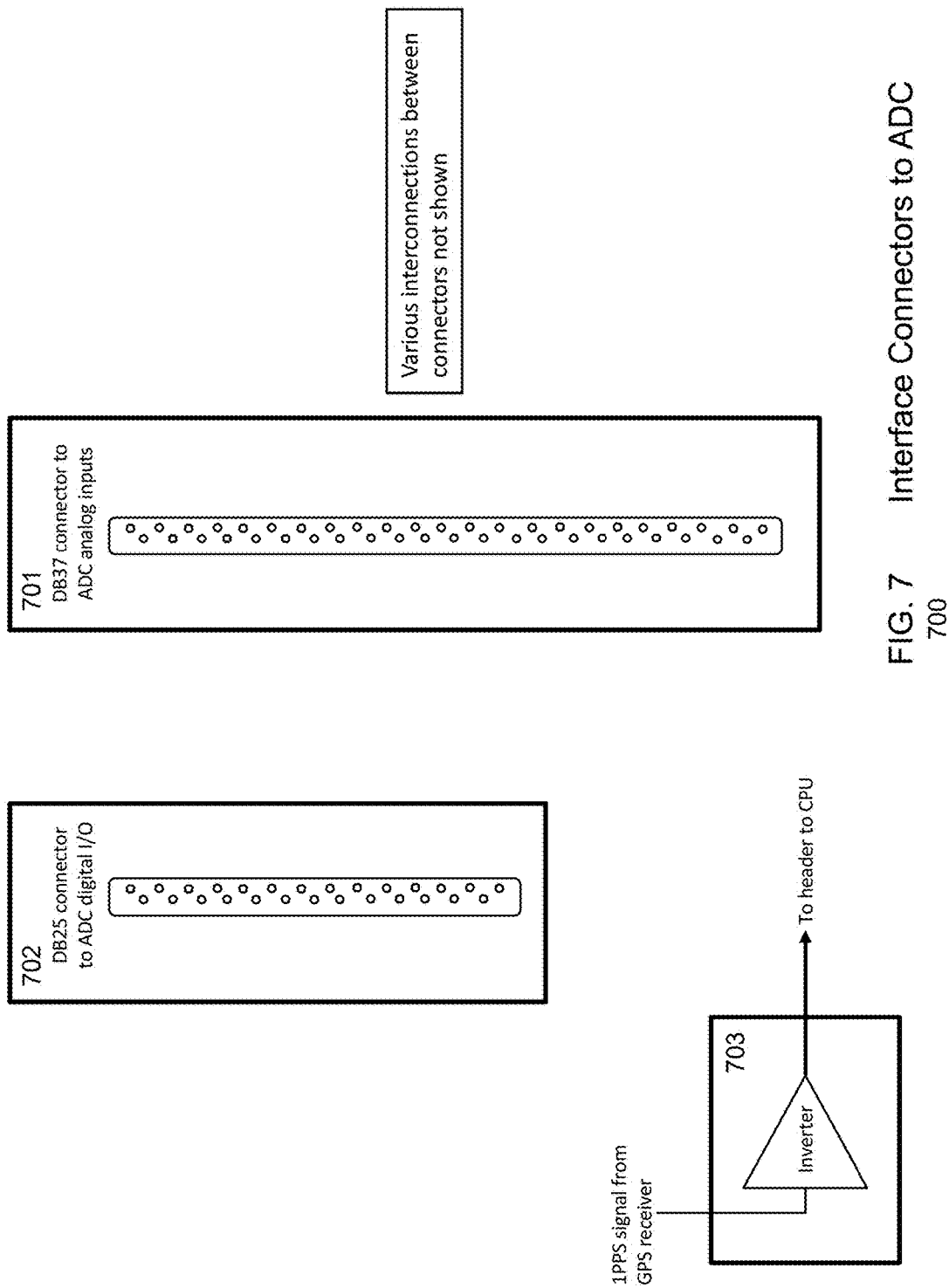
FIG. 7  Interface Connectors to ADC

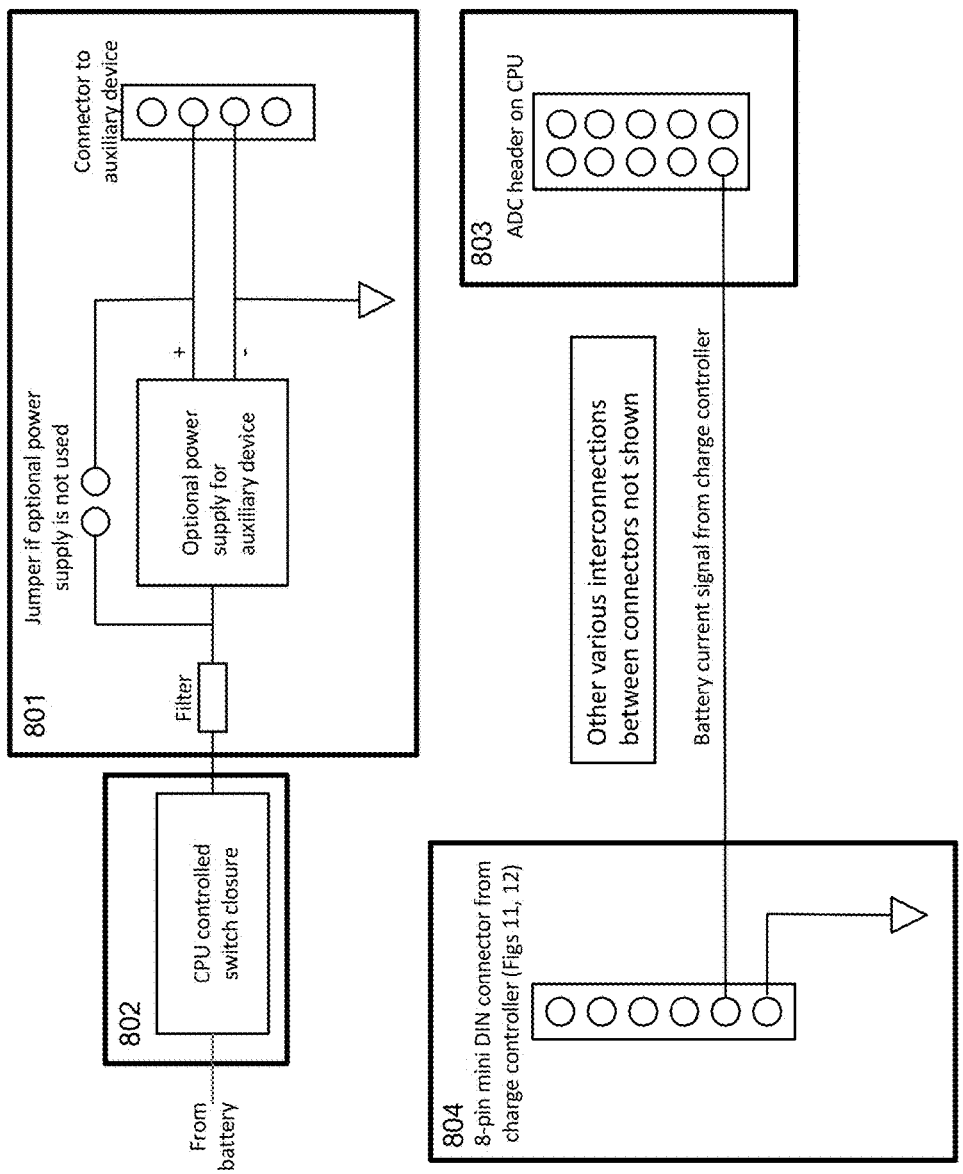
FIG. 8   Auxiliary Power, CPU ADC

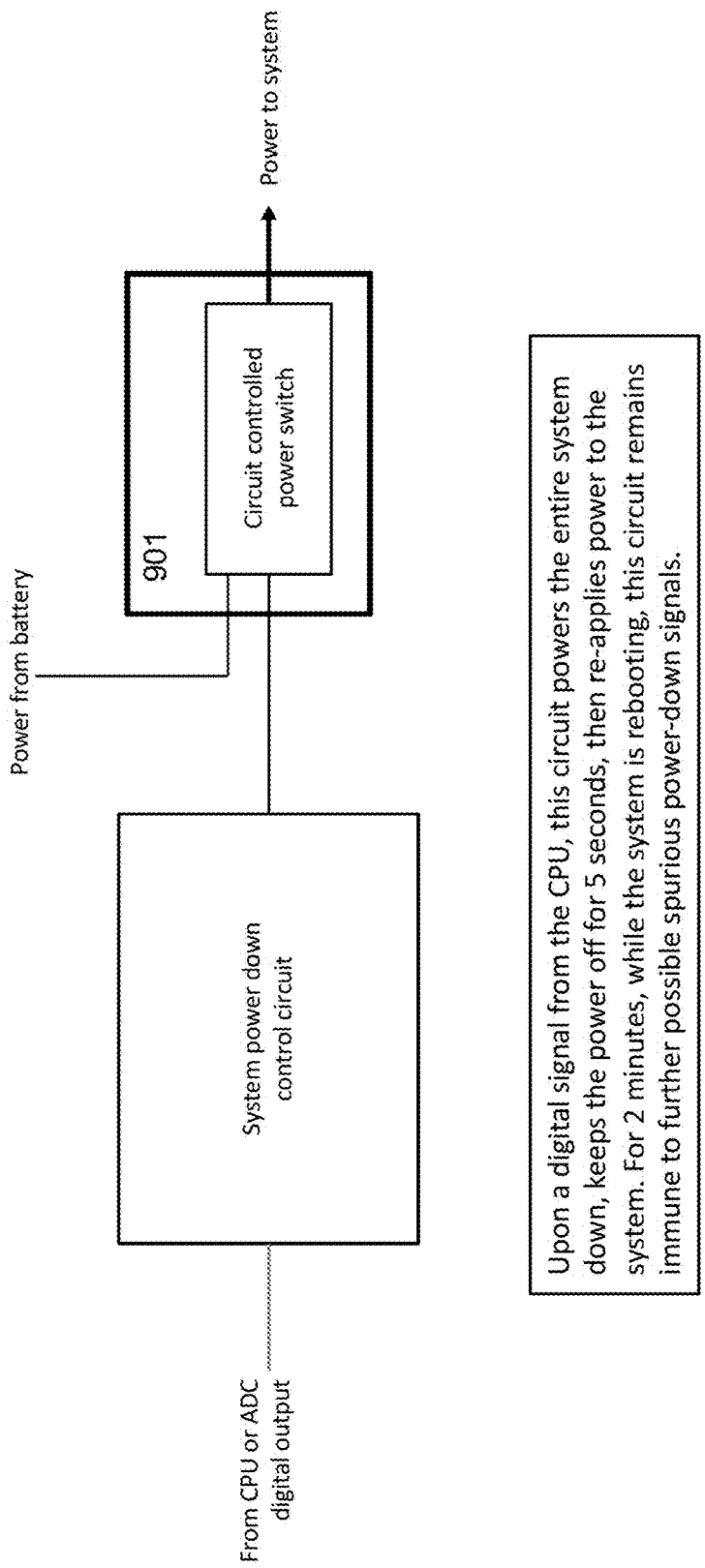
FIG. 9   Power Down Reset Circuit

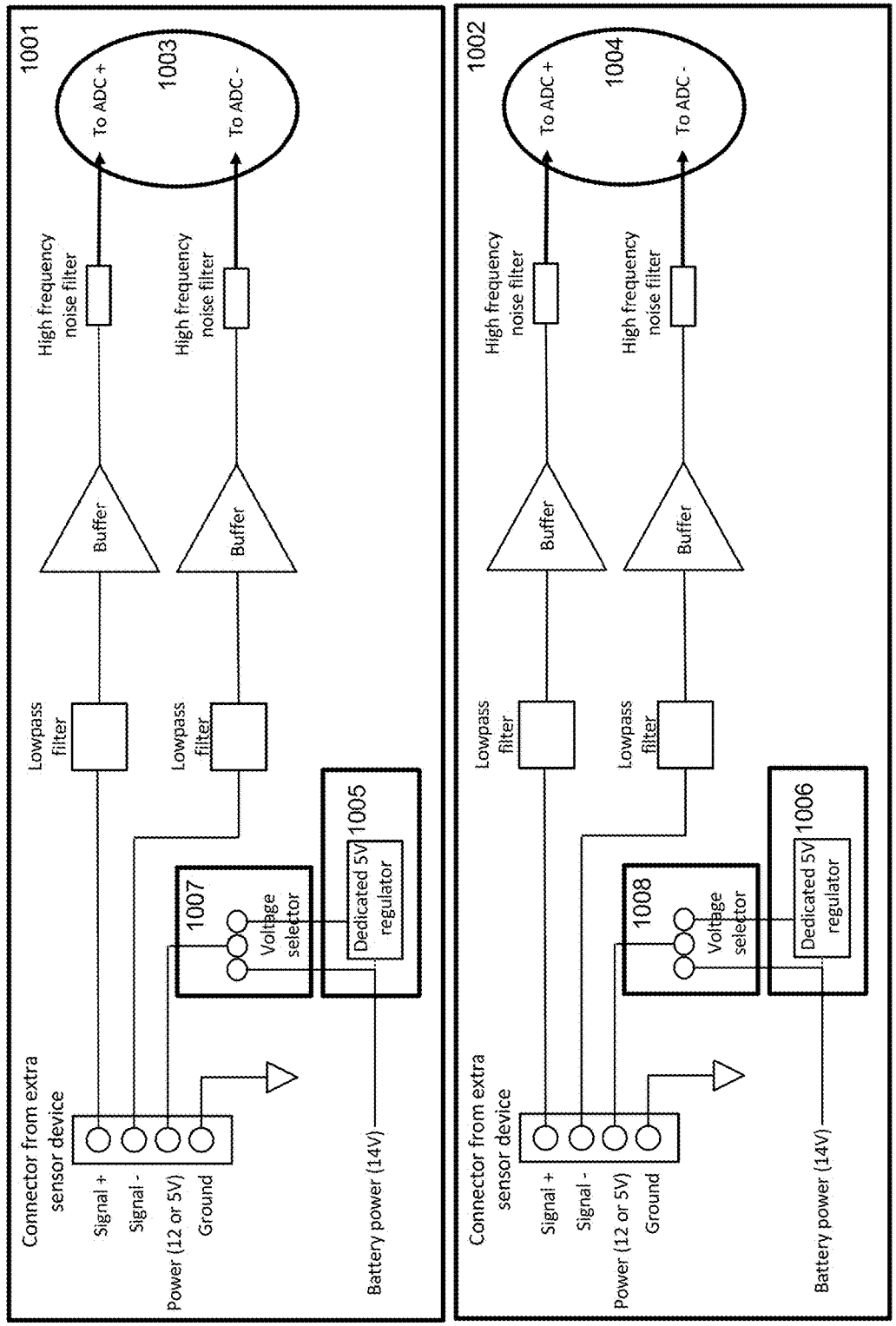
FIG. 10  Extra Sensor Amplifier -Filters

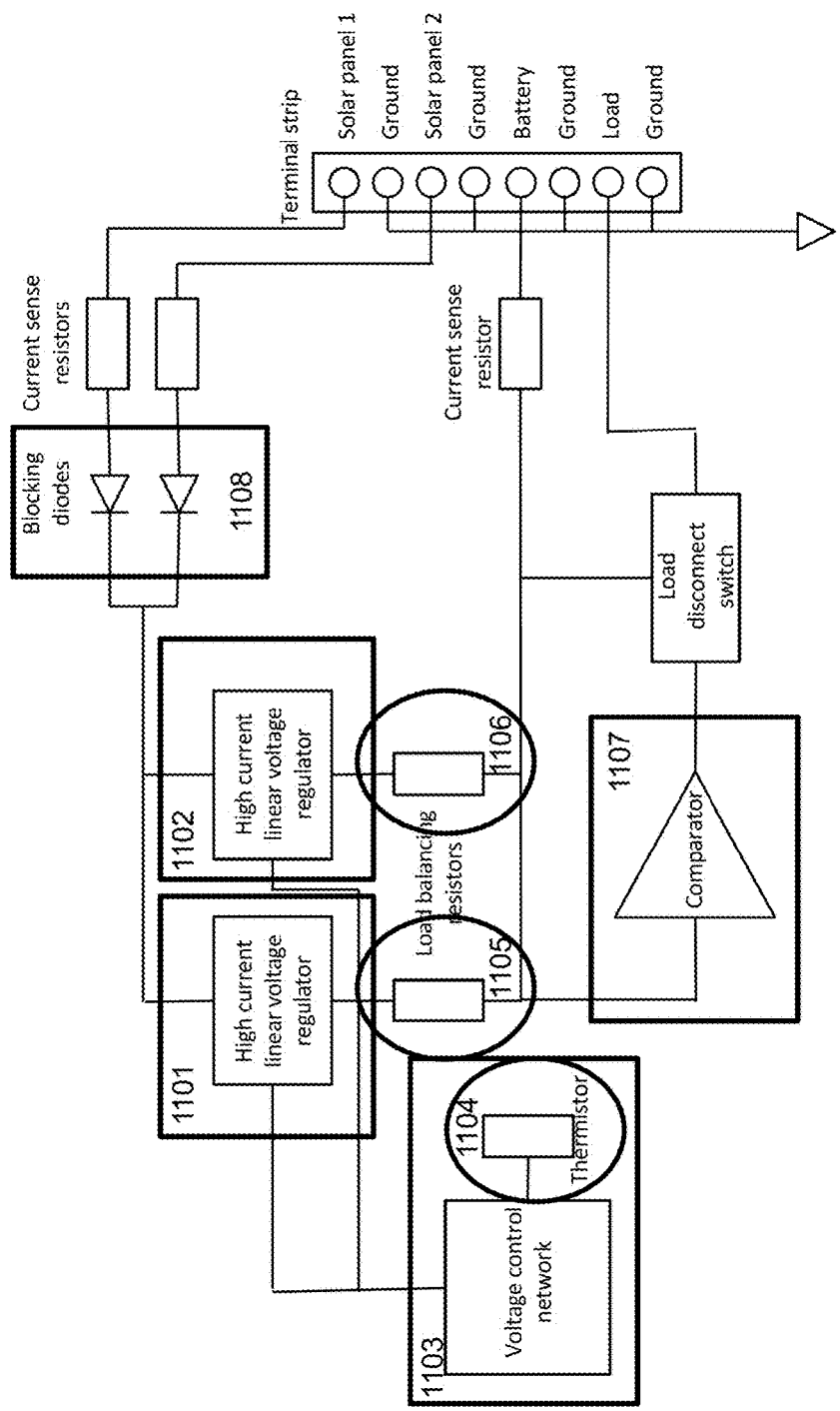
FIG. 11   Battery Charge Controller, Page 1
1100

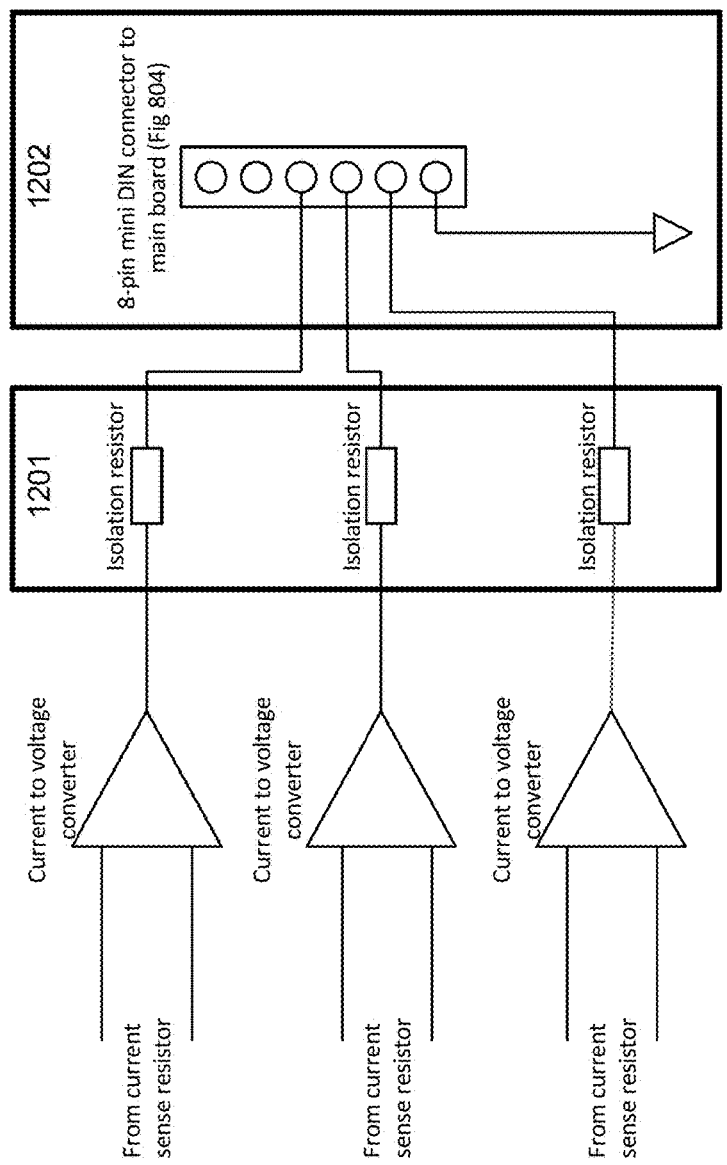
FIG. 12  Battery Charge Controller, Page 2
1200

SYSTEM AND METHOD FOR PROVIDING SHORT-TERM EARTHQUAKE FORECASTS

BACKGROUND

QuakeFinder is a research and development effort aimed at identifying and characterizing earth-emitting electromagnetic (EM) signals as potential short-term precursors to earthquakes. This technology is being developed to provide short-term earthquake forecasts. The inventors have discovered that anomalous electromagnetic activity occurs ahead of large seismic events. Further, this anomalous electromagnetic activity contains relatively consistent pulse shapes and pulse patterns. This has been shown across numerous earthquakes of both strike-slip and subduction types and locations. QuakeFinder has developed a network of sensors to capture and analyze data indicative of a forthcoming earthquake.

The data suggests that earth-emitting electromagnetic signal shapes and patterns begin approximately two weeks before large (e.g., greater than magnitude 4.5) seismic activity events. QuakeFinder has designed and developed an induction magnetometer network covering California faults as well as faults in multiple other countries. Using this network of magnetometers, QuakeFinder collects data about earthquakes and from that data is developing algorithms to identify and characterize the pre-earthquake electromagnetic signals and patterns to develop a short-term forecasting system to predict potentially property-threatening or life-threatening earthquakes.

BRIEF DESCRIPTION OF THE DRAWINGS

The foregoing and other aspects of various embodiments of the present invention will be apparent through examination of the following detailed description in conjunction with the accompanying drawing figures in which similar reference numbers are used to indicate functionally similar elements.

FIG. 5 is a simplified circuit block diagram that illustrates an exemplary ion sensor circuit according to an embodiment of the present disclosure.

FIG. 6 is a simplified circuit block diagram that illustrates an exemplary power supply circuit according to an embodiment of the present disclosure.

FIG. 7 is a simplified circuit block diagram that illustrates an exemplary interface circuit according to an embodiment of the present disclosure.

FIG. 8 is a simplified circuit block diagram that illustrates an exemplary power supply circuit according to an embodiment of the present disclosure.

FIG. 9 is a simplified circuit block diagram that illustrates an exemplary power down circuit according to an embodiment of the present disclosure.

FIG. 10 is a simplified circuit block diagram that illustrates an exemplary interface circuit according to an embodiment of the present disclosure.

FIG. 11 is a simplified circuit block diagram that illustrates an exemplary linear regulator circuit according to an embodiment of the present disclosure.

FIG. 12 is a simplified circuit block diagram that illustrates an exemplary charge controller circuit according to an embodiment of the present disclosure.

DETAILED DESCRIPTION

QuakeFinder stations and sensor networks collect earthquake data near known earthquake faults. In an embodiment, QuakeFinder stations collect and transmit continuous data in eight channels at 50 cycles per second. Each station collects readings from three induction magnetometers (N-S, E-W and vertical), a geophone, two ion detectors (positive and negative), a temperature sensor, and a relative humidity sensor. Using the captured data, QuakeFinder uses signal-processing algorithms to identify potential pre-earthquake signals, pulses and patterns to predict forthcoming earthquakes.

Figure 1:
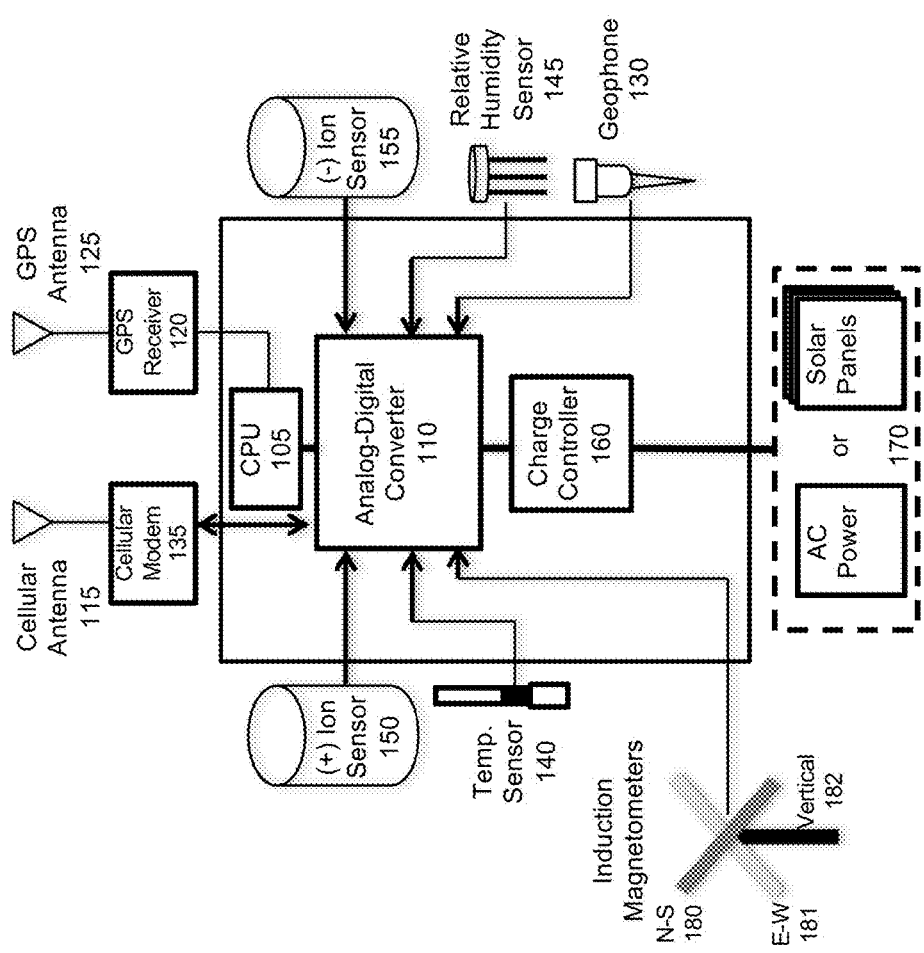
FIG. 1 is a simplified block diagram that illustrates an exemplary QuakeFinder magnetometer station according to an embodiment of the present disclosure.

FIG. 1 is a simplified block diagram that illustrates an exemplary QuakeFinder sensing station 100 according to an embodiment of the present disclosure. The QuakeFinder station 100 may include a CPU 105, an analog board/analog to digital converter (ADC) 110, multiple antennas such as a cellular antenna 115 and a GPS antenna 125, a GPS receiver 120, a geophone 130, a cellular modem 135, a temperature sensor 140, a relative humidity sensor 145, two ion sensors (one that responds to the presence of positive ions in the air 150, and one that responds to the presence of negative ions in the air 155), a charge controller 160, one or more power supplies 170, and several induction magnetometers 180-182. According to an embodiment, QuakeFinder stations use customized ion sensors that have insulating conformal coating on all boards and wires, and stainless steel ion chambers instead of the conventional brass which tends to corrode when exposed to salt air near coastal areas.

QuakeFinder station software manages the collection and local storage of science data from the connected sensors, regularly updates the QuakeFinder Data Center (QFDC) of the health and status of the station, and periodically connects a secure communication channel to the QFDC to enable secure transmission of the scientific data to the QFDC. The station software achieves these goals by communicating with the station's hardware drivers and computer operating system to configure data capture hardware to sample the sensors at an appropriate rate and precision. The captured data is output to a storage location having fast storage (e.g., a Random Access Memory (RAM)). The station software then proceeds to orchestrate the compression and transfer of data to non-volatile local storage (e.g. a USB Memory Stick) where the data can be later transferred to the QFDC via a secure communication channel. The station software minimizes disruption to the data collection activities, nearly eliminates dropped samples, and provides for a continuous series of quality data.

In order to transfer scientific data from the station to the QFDC via the secure communication channel, the station is equipped with an internet connection. For example, the station may be connected to the internet via a cellular data connection, via satellite connection, or via a WiFi bridge to a hardline connection. Special high gain cell frequency antennas or a WiFi bridge to a nearby home where a satellite modem resides may be used. Multiple connections may be available, for example, until an optimal connection method for the station is determined. The station may use standard internet protocols (e.g. SSH) to establish a reverse VPN tunnel with the QFDC or otherwise use a combination of HTTPS and passwords to establish a secure connection. The QFDC can then communicate with the station via the secure channel. According to an embodiment, the QFDC may communicate with the station using remote file synchronization tools to retrieve new scientific data files. The QFDC may also use the tunnel to issue commands or remote software updates to the station. This communication process serves the important purpose of maintaining consistent and accurate data collection and avoiding dropping data during transmission. Receipt of collected scientific data at the QFDC may be delayed but should be without loss.

Additionally, the station software may down sample the scientific data stream, and combine it with station health and status data. Station health and status data, such as internal voltages, CPU utilization, power system and communication system metrics is transmitted in real-time to the QFDC at regular intervals, (e.g., every 10 seconds) as a "heartbeat" data packet. This allows the QFDC to track the health of each station in real-time, independently of the collection of scientific data. The QFDC may then transmit additional instructions to the station to correct or adjust station performance based on the heartbeat data received. By maintaining periodic transmissions of health data, this regulates the flow of the data to the QFDC to avoid overburdening the data reception process at the QFDC. Additionally, the station software actively monitors the performance of the station itself so it can take automatic corrective action (for example, by executing a power reboot of the cellular modem) in the presence of certain anomalous conditions and continue collecting science data, thereby reducing the need for otherwise direct, in person recovery procedures.

The needs of real-time station monitoring and analysis of the scientific data differ sufficiently to warrant different methods of communication. The real-time "heartbeat" data stream may be routed via a less secure or less reliable communication method. For example, the heartbeat data may be formatted into User Datagram Protocol (UDP) packets (which may or may not be encrypted) for "best-effort" delivery to the QFDC. The purpose of the real-time communication is primarily to monitor the current state of the station. This mode of communication can tolerate the loss of a percentage of "heartbeat" data packets. On the other hand, scientific analysis depends on analyzing the changing signals over time and benefits from lossless data streams, but can tolerate some delay in the delivery of the data. Thus, the station communication systems provide mechanisms for both styles: real-time, but potentially partially lost data streams and batched, lossless data retrieval.

QuakeFinder stations collect scientific data which should be carefully recorded. QFDC software is configured to accumulate data from multiple QuakeFinder stations, interpret it, and make it available for downstream processing. In order to ensure accurate results, a best-precision Global Positioning System (GPS)-based time stamp is used with the samples of science data.

According to an embodiment, referring again to FIG. 1, a QuakeFinder station may include a Central Processing Unit (CPU) 105, a battery or other power source 170, a GPS receiver 120, and an analog board and 8-channel parallel digitizer (DIG) 110 to gather and record science data. The CPU may boot from a Secure Digital (SD) card (not shown), and may mount a RAM disk and a USB mass storage disk (not shown). The CPU may be connected to each of the other components. However, due to hardware and software limitations, there may not be a continuous real-time connection between the CPU 105 and the GPS 120. If there is not enough power stored in the battery to operate the station, the CPU may shut off and reboot only when power is restored. Assuming sufficient power is available, the station CPU will boot up, install drivers, begin sampling science data using the DIG, and store sampled data on the RAM disk.

The CPU may acquire an interrupt from the DIG, for example, for a Direct Memory Access (DMA) block transfer. The DIG data is then appended to a growing RAM file until it reaches a preconfigured number of rows. Thus, according to an exemplary configuration on the station, which samples the DIG at 50 Hz and has 38400 rows per file, then a new file is created approximately every 768 seconds. In this fashion, 112.5 data files may be created per day.

According to an embodiment, the DIG block sample count may be configured as 128 rows with three types of defined block types, each with an associated fixed-size header. For example, a first block type defined as an analog block consists of 128 rows, a GPS clock block type captures the CPU clock, and a GPS Serial block type captures the raw GPS serial messages. Each row consists of 11 columns of 32 bits—24-bit analog samples and three 32 bit overhead values.

As each DIG file is completed, it is renamed, compressed by the CPU on the RAM disk, and copied to the USB memory, then deleted from the RAM disk, creating space for the next DIG file. The new name of the compressed USB file may correspond to the CPU time when the DIG file was created.

To maintain accurate timing, when the GPS boots, it acquires timing data that is delivered to the DIG in a precise once-per second pulse interrupt, followed by appropriately formatted data delivered over a serial interface. For example, the data may be delivered in formatted National Marine Electronics Association (NMEA) sentences.

The CPU, GPS and DIG each may have independent clocks that may be available to determine precise time stamps. As previously noted, the QuakeFinder station also includes an internet connection which may be used to set the CPU clock when communications are available. During execution, the CPU may periodically attempt to use the internet to reset a drifting CPU clock. For example, the CPU may use the Network Time Protocol (NTP) for clock synchronization. If communication with internet is not available, the CPU may be subject to drift. Post processing of the data may interpolate or estimate the timing of incoming samples until the internet connection can be restored and the clock synced.

At the QFDC, if everything is operating as intended, the compressed DIG-derived files are delivered for processing. In some samples, there may be a discrepancy between the CPU file name time and the more accurate GPS timing data that the file actually contains. This discrepancy may be determined to be allowable, for example, if the GPS 1 pulse per second signals and the NMEA strings exist for all (86400) or most of the day. If the PPS/NMEA string pairs are missing or spotty, it indicates a problem in the timing process, and then the file name may be adjusted or interpolated based on file names (including on board CPU clock times) to more accurately reflect the file creation time. The CPU clock times are updated with network time several times each day, and represent a backup timing method. The data files are finally collected into one-day groups based on the file name, GPS time stamps, and time interpolations to represent GPS-correlated time (accurate within the 50 samples per second granularity). The analog blocks for each day may then be organized into a data map for analysis.

The scientific data collected by QuakeFinder is used in an earthquake forecasting process that evaluates three primary indicators: (1) infrared (IR) nighttime temperature slope data; (2) earth-emitting unipolar pulse counts detected by the magnetometers 180-182; and (3) ion data, detected by ion sensors 150, 155, for each instrument site. As will be explained in greater detail below, if one, two, or all three indicators show readings sufficiently outside the average historical readings for the station, and the patterns of the detected magnitude and timing of the indicators follow previous observations of pre-earthquake activity, there will be an increased probability that an earthquake will occur in the next 24-48 hours near the instrument site.

IR data is collected each day over areas covering the QuakeFinder station locations. For example, IR data may be obtained from the Geostationary Operational Environmental Satellite (GOES). According to an exemplary embodiment, GOES IR camera data is downloaded and processed to identify cloud-obscured pixels in the camera data. For example, an IR image for California may be processed to identify both cloud obscured pixels as well as pixels where the cloud edges are identified, by identifying all pixels that are fully or partially obscured by clouds, assigning a probability that each pixel is clear or obscured, and plotting all pixels with coded areas showing obscured, partially obscured, or clear pixels. The pixels may also be rated for confidence, indicating the probable accuracy of the pixel identification. Groups of 4 km×4 km pixels in symmetric rows and columns (e.g. groups of either 9 or 16 pixels) may then be formulated near known QuakeFinder stations.

A nighttime slope of the pixel temperatures (for example, from 10 PM to 4 AM local time) may then be calculated. A negative slope indicating night time cooling is expected where there are no earthquakes forming. However, if the night time slope changes to zero or to a positive slope, then the IR instrument is detecting apparent overnight "heating" which can mean that ions (whose generation is discussed in more detail below) are neutralizing when colliding with air or water molecules, and releasing IR energy in specific bands detectable by the IR camera. However, if there are cold clouds moving away from a specific pixel and uncovering the warmer ground, then this circumstance may lead to an incorrect indication of night time heating. The pixels identified as obscured or partially obscured by clouds are then used to accept or reject the nighttime slopes as valid when the area is clear or invalid when there is excessive cloud noise. If the slopes of these groups of 9 or 16 pixels are positive (averaged over the 9 or 16 pixels) and valid (not cloud obscured), then the IR data may be used with the associated pulse data and ion data and compared across multiple instrument sites to identify data patterns indicative of an earthquake. The confidence level of the data may be enhanced if two, or all three indicators (magnetic pulses, ions, and IR slope data) show a significant change in the days to hours before an expected earthquake. The positive, valid data is then compared to known patterns of positive valid data collected in the days and weeks leading up to previously recorded earthquakes.

Electromagnetic unipolar pulses, those pulses collected by induction magnetometers that exhibit a predominant direction (mostly positive or mostly negative), are theorized to originate from deep in the ground, typically 5-50 km deep. Any electromagnetic pulse that diffuses through the ground does so more efficiently at ultra-low frequencies (e.g. below 1-5 Hz). This allows QuakeFinder to identify relevant pulses based on the polarization of the pulse (using two or more magnetometers and one or more magnetometer sites), the duration of the pulse (typically greater than 300 msec.), and the shape of the pulse (typically a slow rise time and a characteristic slow fall time in a unipolar shape (e.g. mostly above the magnetic zero point)). The pulses that occur between adjacent stations should also be detectable from two or more relatively close stations but will not be detectable at a distant, reference, station.

According to an embodiment, relevant unipolar pulses (e.g. earthquake+noise pulses) are identified as those waveforms that are higher than the average background noise in each site (e.g. 2-3 sigma above the noise), and that have rise times on the leading edge of the pulses that were longer than 3-5 samples at 50 samples per second and a duration longer than 500 milliseconds.

According to an embodiment, unipolar pulses belonging to known pre-earthquake episodes are used to train Principal Component Analysis (PCA) algorithms to identify distinct types of unipolar pulses. For example, the unipolar pulse may be categorized as a first type with a duration of 1-2 seconds; as a second type with a duration shorter than 1 second; and as a third type with a duration of 3-15 seconds. Identification of unipolar pulses should take into consideration and eliminate known noise signal sources. The PCA algorithms may then be used to match captured pulse data to historical patterns of captured pulse data.

There are many electromagnetic noise sources that must be identified and eliminated from the pre-earthquake identification processes. QuakeFinder has identified many of these noise sources and their attributes. The system identifies and eliminates these known types of noise signals. Noise signals tend to be in specific frequency bands. A combination of band-pass filters and waveform identification can be used to eliminate some noise signals. Additionally, noise signals can often be identified by their shape and repeating or cyclical nature.

For example, lightning is a noise source, and will produce magnetic unipolar pulses that must be identified so that they are not counted as earthquake-generated pulses. Lightning related pulses may be identified by calculating the rise time, or slope, of the pulse along with the pulse width. For example, if the rise time is fast (within 1-3 samples or 8 msec) and the width is short (less than 500 msec), the detected pulse is most likely a lightning pulse. Alternatively, known lightning strikes may be determined from a detection network, such as EarthNetworks (www.earthnetworks.com) or another source to confirm that the detected pulse is attributable to lightning. A lightning database may be created that contains the time and location (Lat/Long.) of all pulses that QuakeFinder has selected to be within a selected distance (e.g. 100 km) of a given magnetometer instrument site. Then, if the pulse being tested occurs at the same time as a nearby pulse in the database, the pulse is tagged as a lightning noise source.

Noise may also be caused by cars and trucks passing within 100 to 300 meters of the magnetometer instruments. For example, certain bipolar pulses (excursions above and below the zero level) may be generated by cars and trucks within about 800 feet of the QuakeFinder stations, are considered as "noise," and are eliminated from the overall pulse set. Such noise signals may be identified because they have single or twin bipolar signals (e.g., they rise above the zero level and fall below the magnetic zero level), and they cannot be detected at adjacent stations, greater than 1 km from the original station.

Noise may also be caused by solar storms that create magnetic disturbances. For example, a continuous pulse having a 1-5 second duration; an irregular pulse having a 1-40 second duration; or an impulse having a 40-150 second duration may be attributable to a solar storm. These noise sources are worldwide and can be seen at all QuakeFinder stations. They can be eliminated by comparing the noise detected at a test station with the noise detected at a distant reference station (e.g. a station more than 300 km away from the test station). When both the test station and the reference station record a pulse at the same time, then the pulse is attributable to solar-generation and should be ignored.

Noise may also be caused by local machinery. This noise source is typically a repeating type of signal that can be detected by observing a repetition in the time between pulses, in contrast to earthquake pulses, which are typically more random. Similarly, noise caused by electric fences or moving metal tend to be detected as repeating bi-polar signals.

Noise may also be caused by electric trains. For example, in the San Francisco area which is located over or near several faults which have been the source of frequent, if not at times continuous seismic activity, the Bay Area Rapid Transit (BART) system produces large signals in the ULF magnetic band. These signals are due to the electric currents that are used to accelerate or decelerate the trains, and can typically be detected from 5-160 km from a QuakeFinder station. If the magnetometer site is closer than 5 km, the train signals are so large as to saturate the magnetometer detection. Accordingly, QuakeFinder sites are selected so as to be at a safe distance from electric train tracks.

According to an embodiment, the detected unipolar pulses are compared across multiple adjacent QuakeFinder stations to determine whether pulses are present simultaneously in multiple stations. If detected pulses are simultaneous at adjacent or relatively close stations, they are accepted as candidate pulses. If simultaneous pulses are not present in sites that are greater than 100 km apart, and they are not simultaneous with a list of known lightning strikes within 500 km, then the pulses are accepted a candidate earthquake pulses.

QuakeFinder station sites should be located within one mile of a known fault (in order to be close enough to be able to detect small electromagnetic signals), and spaced approximately every 32 km for maximum coverage. A specific site survey may be performed to identify quiet locations using a portable magnetometer, and a checklist of potential noise sources. If the background noise as observed on an oscilloscope attached to proprietary test equipment is less than 20 mv, and a visual inspection shows no power lines or transformers within 30 meters, no roads within 100 meters, no wire or steel fences within 30 meters, and no pumps or large electrical equipment/houses within 30 meters, then the location may be considered appropriate for installation of a QuakeFinder station.

QuakeFinder stations additionally evaluate field ion level data. Charge carriers (p-holes) generated at depth by asymmetric stress changes beneath the earth's surface migrate to the surface and interact with air molecules. These charge carriers eventually ionize the air into positive ions, or in some cases they will congregate near sharp rock outcroppings and actually cause lightning-like discharges which may result in so-called "earthquake lights" and a flood of negative ions. QuakeFinder stations measure both positive and negative ion concentrations and evaluate ion concentrations as a third indicator of pre-earthquake activity.

The ion sensors capture the level of ions detected at each QuakeFinder station. Then, the collected ion data may be monitored for increases in the level of ions detected. For example, each QuakeFinder station will have a normal range of ion levels collected over a two-week period, which may vary from station to station depending on the environment of the individual station. Then, when a detected ion level collected over a two-week period exceeds the normal range, for example, by an amount greater than a statistical threshold such as 1-2 standard deviations (1-2 sigma) above the historical average, then the next 24-48 hours are considered to be higher risk for the occurrence of an earthquake greater than M4.5. The statistical threshold may vary and may be calculated based on station history, station noise environment, and the statistical histories of the ion levels over multiple stations and multiple previously recorded earthquakes.

The ion sensors have been customized specifically for outdoor, field operations. QuakeFinder stations use electronics that are conformally coated to reduce the possibility of sneak current paths in the circuits that require Giga-Ohms of isolation. In addition, QuakeFinder sensors' internal ion chambers are fabricated from stainless steel to avoid unacceptable salt air corrosion for units that are often deployed near oceans. The ion sensors are installed in special conductive foam carriers, which are installed in stainless steel weather-proof cylinders. Special fine grain stainless steel mesh is used to keep insects out of the sensor area inside the stainless steel enclosure as part of the QuakeFinder station.

As in any instrument, ion sensors are also affected by various noise contamination. Therefore, the outputs of the ion sensors must be evaluated to eliminate alarms due to ion instruments that have become "contaminated," for example, by dust inside the ion chambers or by elevated levels of atmospheric humidity. This combination of dust and humidity may cause increased conduction between two plates inside the ion sensor due to the wet or conducting surfaces inside the sensor which will result in an erroneous high or saturated level output. Therefore, QuakeFinder stations include a relative humidity sensor whose data is tested for an adjustable threshold (e.g., >90%) before the ion data may be considered "trusted". Ion data collected when the ion sensor is exhibiting signs of being dirty, such that the sensor regularly saturates when the humidity is above the adjustable threshold, may be ignored.

Combinations of specific patterns of unipolar pulses, IR nighttime positive ground temperature slopes, and elevated ionization levels are used by QuakeFinder to evaluate the probability that the earthquake signals are present and that they are not being "spoofed" by false or noise-contaminated signals. QuakeFinder algorithms identify any patterns in unipolar pulse daily counts, ion levels, and IR night time temperature slopes. These patterns may then be compared against known patterns. These known patterns typically span a time period from two weeks to 24-48 hours prior to an earthquake. Therefore, for example, when captured data matches a known pattern (corresponding to a prior occurrence of an earthquake) over a two-week period of time, a short term prediction may be made (typically 24-48 hours in advance) that an earthquake of magnitude 4.5 or greater may occur. Using data collected from QuakeFinder stations over several years, the identified patterns for pulses, ions, and IR are tested retrospectively to determine whether the newly detected patterns match those patterns that existed in the lead up to a captured earthquake. For example, a pattern match may be detected when the most recently collected counts of unipolar pulses, the most recently detected ion levels, and the calculated nighttime infrared slopes each increase at approximately the same time(s) within the two-week window as a known pattern, and with approximately the same magnitude as the known pattern.

For the case of unipolar pulses identified by a magnetometer, the collected data may be scanned for increases in energy within several seconds (e.g. approximately 3 seconds) and is compared to energy increases over a larger period (e.g. approximately 70 seconds). The 3 sec time periods with high energy levels are called pulses. However, because lightning, nearby moving vehicles, and solar storm disturbances can also generate "noise" pulses, each noise pulse is identified and characterized (based on pulse shapes, amplitudes, comparisons with known noise pulses, comparisons with signals at distant reference stations, etc.) The noise pulses are then removed from the data set and the remaining "clean" pulses are counted for each day.

Each QuakeFinder station will then have a normal range of cleaned pulses, which may vary from station to station depending on the noise environment of the individual station. The total unipolar pulse counts over a two week sliding period may then be calculated and the total two-week count compared to the total pulse counts for a sliding historical 2-week period over a predetermined period of days, for example, the last 90 days, at the same station. If the most recent 2-week pulse count is greater than in a previous 2-week period, for example, by an amount greater than a statistical threshold such as 1-2 standard deviations (1-2 sigma) above the historical average, then the next 24-48 hours are considered to be higher risk for the occurrence of an earthquake greater than M4.5. According to an embodiment, the total unipolar pulse count in a two-week sliding window may be given a ranking number. This ranking number ranks the count based on the number of clean pulses detected as compared to all other detected counts. For example, the time period with the highest count of clean pulses will have the highest ranking. Then the next 24-48 hours after a time period with a ranking higher than a count detected in the two-week time period leading up to a known earthquake will be considered to be higher risk for the occurrence of an earthquake greater than M4.5. The statistical threshold may vary and may be calculated based on station history, station noise environment, and the statistical histories of the clean pulse counts over multiple stations and multiple previously recorded earthquakes.

Figure 2:
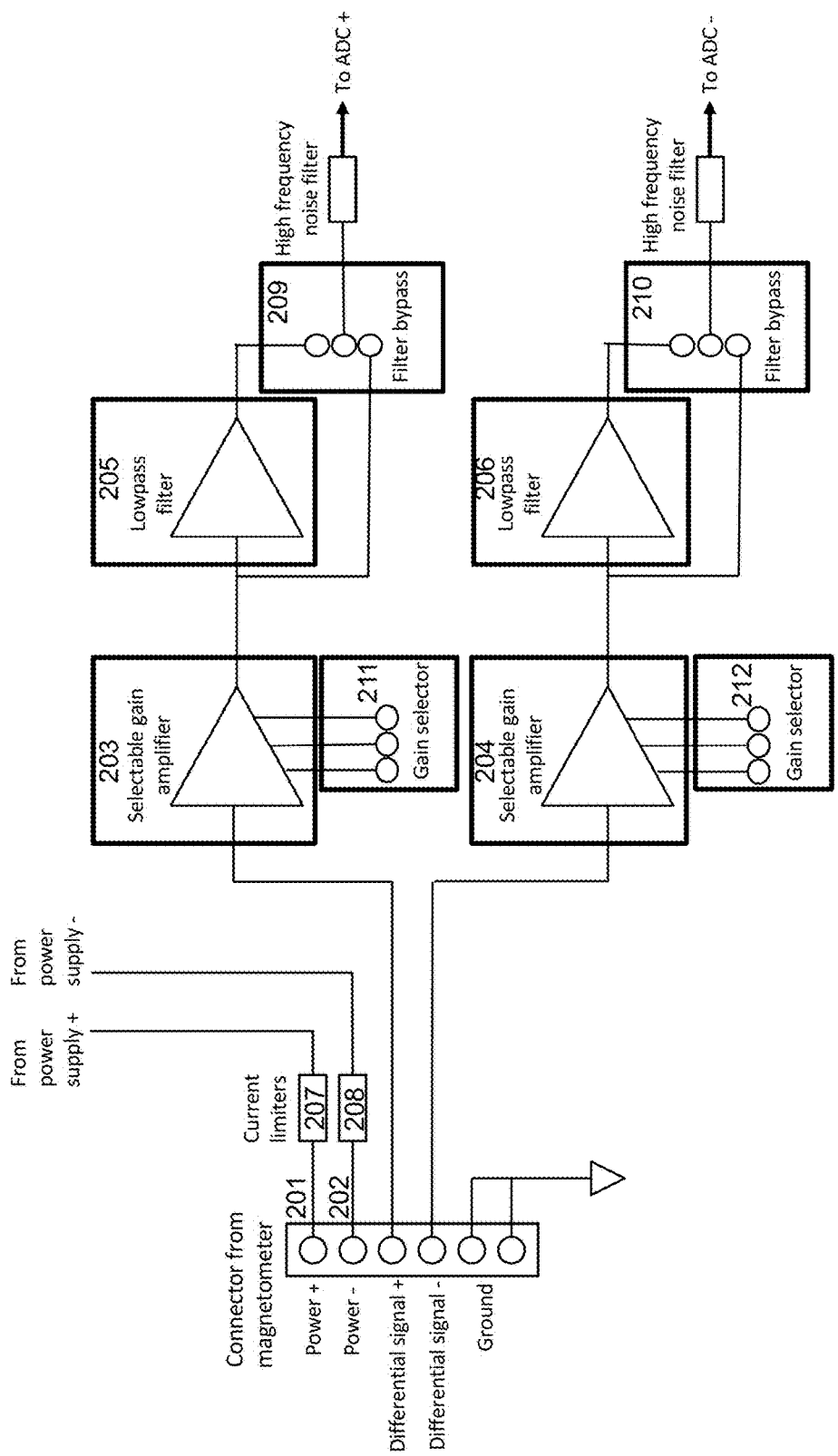
FIG. 2 is a simplified circuit block diagram that illustrates an exemplary magnetometer amplifier circuit according to an embodiment of the present disclosure.

FIGS. 2-12 illustrate an exemplary set of circuit board block diagrams used to implement an exemplary QuakeFinder station as described above. FIG. 2 is a simplified circuit block diagram for an exemplary amplifier circuit 200 for use in a QuakeFinder station. The circuit 200 includes amplifiers 203, 204 (which may be selectable gain amplifiers) and low-pass filters 205, 206 for use with a magnetometer. The use of very low noise op-amps is optimal for processing very low frequency signals. In the illustrated embodiment, the op-amps are bipolar, thereby eliminating latch-up or inversion issues that arise with Field Effect Transistor (FET) op-amps. The amplifiers 203, 204 illustrated in the first stage of FIG. 2 have selectable gains provided by jumpers 211, 212 to match different output levels for different magnetometers as necessary and to obtain a large dynamic range. The remaining stages illustrated in FIG. 2 make up low-pass (e.g. 13 Hz) "anti-aliasing" filters 205, 206 that condition the signal prior to the ADC (not shown). The illustrated low-pass filters provide attenuation at 50 and 60 Hz in order to suppress strong ubiquitous signals that tend to impinge on an induction-based magnetometer.

In the embodiment illustrated in FIG. 2, FET transistors 207, 208 are provided in series with the positive 201 and negative 202 power rails that supply power to the magnetometer. These FETs 207, 208 limit the amount of current that could be drawn from the power supplies in the event of a short-circuit or other overload condition from the magnetometer or underground connecting cables, thereby avoiding disabling or otherwise bringing down the entire power system by such a condition. In the illustrated embodiment, jumpers 209, 210 are provided at the outputs of the amplifier-filter chain to allow bypass of the low-pass filters 205, 206 if necessary for testing purposes.

Figure 3:
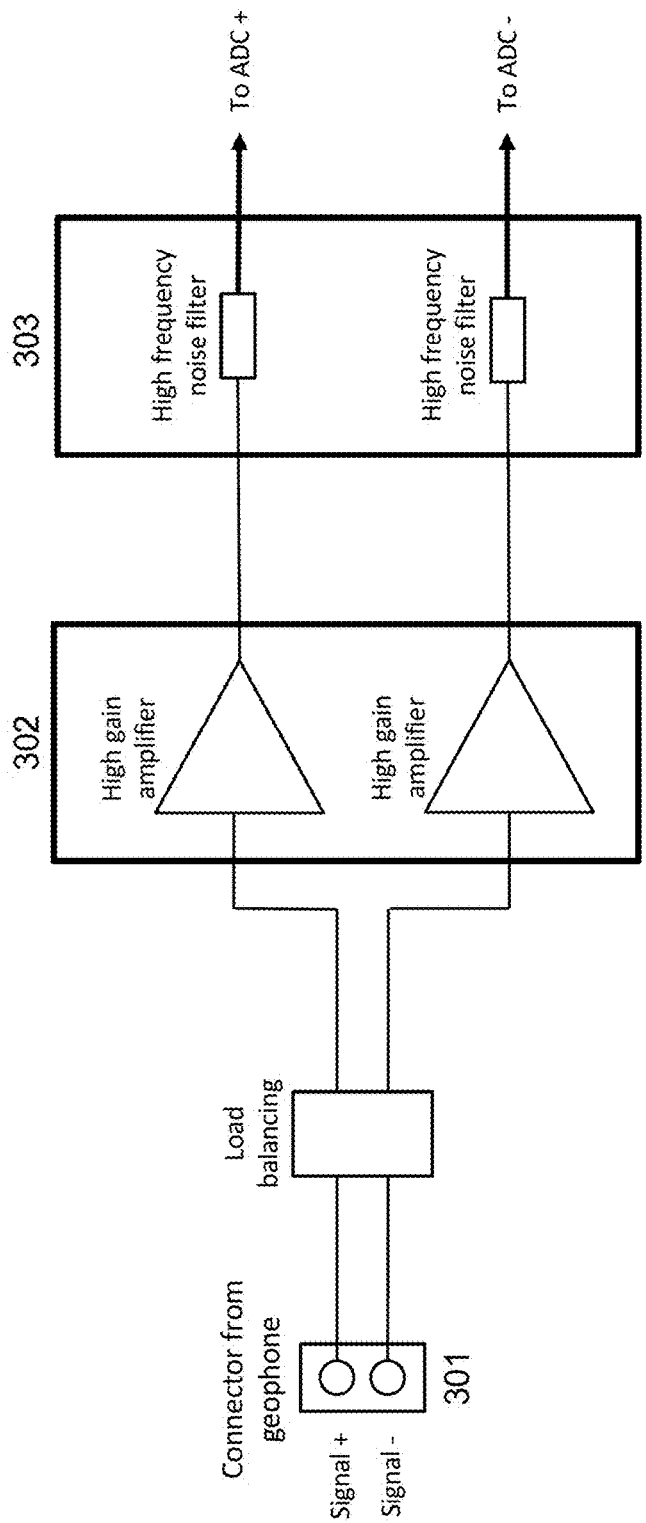
FIG. 3 is a simplified circuit block diagram that illustrates an exemplary geophone amplifier circuit according to an embodiment of the present disclosure.

FIG. 3 is a simplified circuit block diagram for an exemplary amplifier circuit 300 for use in a QuakeFinder station. This circuit 300 operates a geophone which responds to movement of the earth. The signals the circuit 300 produces help evaluate what portion of the signals produced by the magnetometer is due to motion which may be caught as "noise" in the magnetometer data that should be removed. As shown in the embodiment illustrated in FIG. 3, the circuit 300 includes a differential amplifier 302 with a low input 301. A differential configuration is illustrated to minimize common-mode signals that are commonly produced by temperature variations (temperature "drift"). As shown, the gain of the amplifier 302 is high to amplify the geophone's small output to a level that can be resolved by the ADC. The circuit 300 may include a low-pass filter 303 for anti-aliasing.

Figure 4:
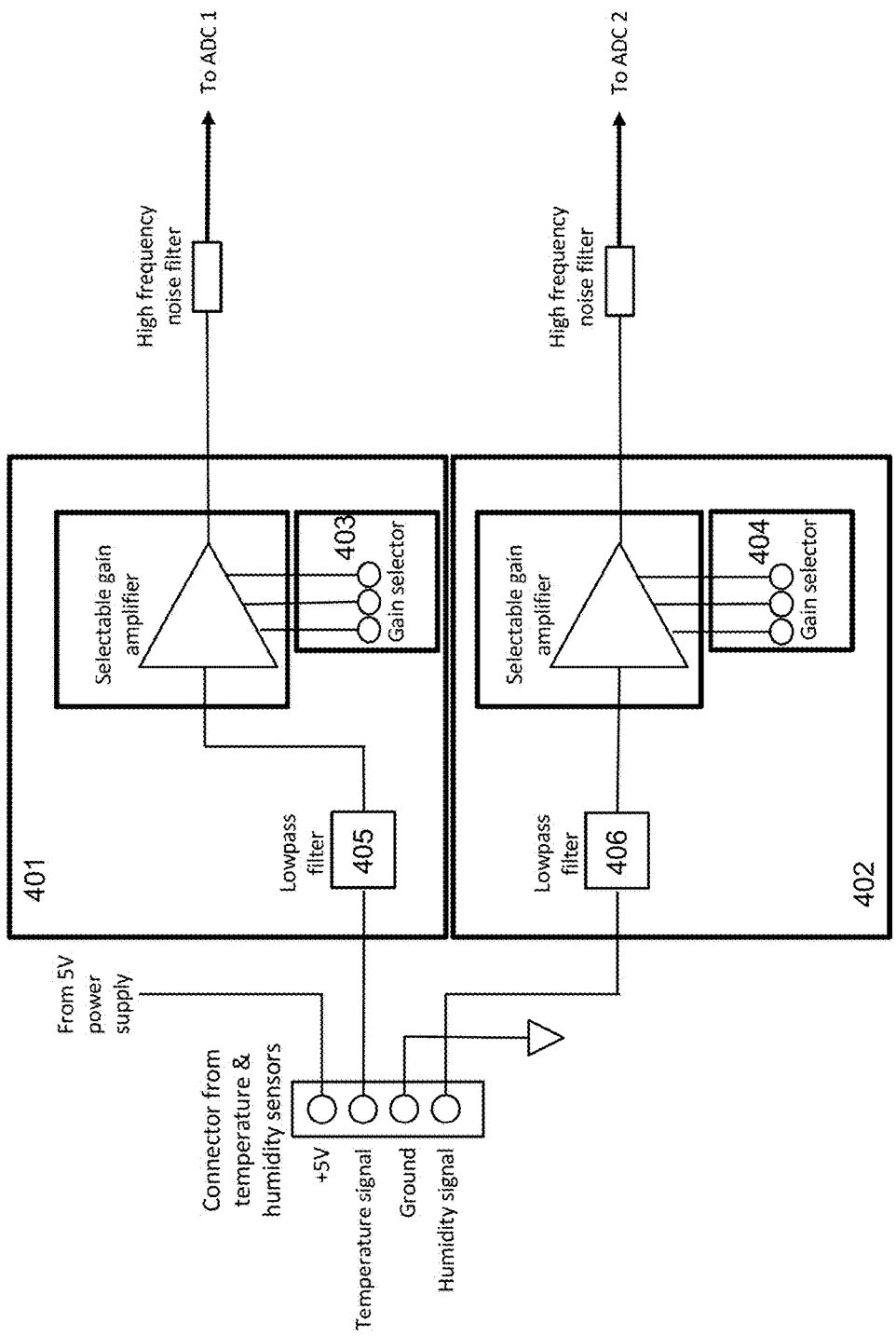
FIG. 4 is a simplified circuit block diagram that illustrates an exemplary amplifier circuit according to an embodiment of the present disclosure.

FIG. 4 is a simplified circuit block diagram for an exemplary amplifier circuit 400 for use in a QuakeFinder station. As illustrated in the embodiment shown in FIG. 4, the amplifier circuit 400 includes two amplifiers 401, 402, one for an external temperature sensor and one for an external relative humidity sensor (respectively). Jumpers 403, 404 are provided so that the gain may be selected to optimally match the characteristics of the respective sensors. Each amplifier 401, 402 of the circuit 400 may include a low-pass filter 405, 406 to perform anti-aliasing.

A humidity sensor may be implemented as part of an exemplary QuakeFinder station in order to identify periods where the ambient relative humidity is so high (typically 90% or greater) that the data from the ion sensors may not be trusted due to dirt and moisture inside the sensing chamber or on the electronics.

FIG. 5 is a simplified circuit block diagram for an exemplary ion sensor circuit 500 for use in a QuakeFinder station. The embodiment illustrated in FIG. 5 is designed to accommodate the high common-mode outputs of air ion sensors (not shown). As previously described, an exemplary QuakeFinder station uses two ion sensors, one that responds to the presence of positive ions in the air, and one that responds to the presence of negative ions in the air. The common-mode component of the signals produced by these ion sensors is so high that it would overdrive the ADC. The embodiment illustrated in FIG. 5 includes two identical circuits 501, 502, one for each ion sensor. Circuits 501 and 502 use level shifter 503, 504 to level shift the ion sensor signal to a zero common mode before applying a low-pass filter 505, 507 and transmitting the signal to the ADC (not shown).

As shown in the embodiment of FIG. 5, to properly power the ion sensors, the power supply must be totally isolated, or "floating", and not referenced to ground. This power is supplied by two separate isolated DC-DC converters (not shown). Also, a software-controlled relay 509 may be provided to serve as a mechanical on-off switch to both sensors, for use during calibration.

FIG. 6 is a simplified circuit block diagram for an exemplary power supply circuit 600 used in a QuakeFinder station. The entire system is powered by an external 12-volt battery (not shown). According to an embodiment as illustrated in FIG. 6, several power supply connections for the station are provided including connections to the external battery 601 (or other power source, such as a solar panel, as shown), connections to a third-party CPU serial port 602, and connections to a GPS receiver 603. Two power supply modules 604 supply isolated 12 volts DC to the two air ion sensors. A heavily filtered power supply module 605 provides positive and negative 12 volts (relative to ground) for the analog circuits. A simple linear regulator 606 provides 5 volts to the logic circuits and to power the temperature and humidity sensors. Circuitry 607 provides for the conditioning and exchange of various signals to and from the GPS receiver.

FIG. 7 is a simplified circuit block diagram for an exemplary interface circuit 700 used in a QuakeFinder station. According to an embodiment as illustrated in FIG. 7, subminiature "D" connectors connect via ribbon cables to external ADCs. A 37-pin connector 701 delivers eight differential analog signals to a 24-bit ADC board and a 25-pin connector 702 delivers digital logic signals from an ADC board, controlled by software running on the CPU, to activate various relays described herein. The 25-pin connector 702 also transmits digital logic signals to the ADC board digital inputs, which can be read by the software running on the CPU. One digital input may be used to sense the state of a door-open switch on a door to the enclosure housing the equipment, for example. The other three digital inputs may be connected to their corresponding digital outputs, allowing the software to "read back" and confirm the values it had written to the digital outputs. A digital logic inverter 703 supplies inverted 1-pulse-per-second pulses to the CPU board as needed.

FIG. 8 is a simplified circuit block diagram for an exemplary power supply circuit 800 used in a QuakeFinder station. The embodiment shown in FIG. 8 includes power supply circuitry 801 that provides power to an external communications device such as a cellular modem. This power supply can be switched off and on, via relay contacts 802, under software control. Thus, if the software algorithms determine there is a serious communications failure that can only be resolved by powering the external communications device off and then on again, it can do so.

If the external device requires a 12-volt supply, then power supply module PS4 (part of the power supply circuitry 801) is not populated and the jumper routes the 12-volt battery voltage to the power out connector. However, if the external device requires a different voltage, 5 volts for example, then a different, appropriate power supply module may be installed and the jumper removed to provide the proper power to the connector.

As shown in FIG. 8, a connector 803 can be used to bring in an analog signal from the proprietary charge controller 804 that is proportional to the current flowing into or out of the battery. This analog signal, along with other analog voltages such as the battery voltage and solar panel voltage, may be routed to the CPU's built-in ADC via a 10-pin ribbon cable connector.

FIG. 9 is a simplified circuit block diagram for an exemplary circuit 900 used in a QuakeFinder station. In the embodiment shown in FIG. 9, circuit 900 enables a CPU, under software control, to initiate a complete, full power-down reboot of the entire system. Upon receipt of the appropriate logic signal from the CPU, which can be transmitted via a variety of methods, the circuit 900 energizes the relay 901 to remove power from everything other than the circuit 900 for 5-10 seconds, and then to re-apply power. In order to give the CPU enough time to completely boot the operating system and set its initial conditions, circuit 900 holds itself immune from, and will not respond to any further signal, for 100 seconds. After 100 seconds, circuit 900 is re-armed and ready to be activated.

FIG. 10 is a simplified circuit block diagram for an exemplary circuit 1000 used in a QuakeFinder station. According to the embodiment illustrated in FIG. 10, two identical analog channels 1001, 1002 are available for use by two additional sensor devices as needed (not shown). Two connectors 1003, 1004 supply power to and receive analog signals from the devices. A separate voltage regulator 1005, 1006 is provided for each device, and a jumper 1007, 1008 to select 12 volts (battery voltage) or 5 volts to accommodate the power requirements of each device.

FIG. 11 and FIG. 12 are simplified circuit block diagrams for an exemplary charge controller 1100 used in a QuakeFinder station. The QuakeFinder station uses inductive magnetometers that are extremely sensitive to magnetic energy as the primary sensor device. Standard solar panel controllers use switching circuits that produce high levels of electromagnetic noise. A custom charge controller that does not produce such noise is therefore required. As shown to the embodiment illustrated in FIG. 11 and FIG. 12, the battery charge controller uses entirely linear, non-switching circuitry. The charge controller accommodates either one or two solar panels, and can also be used in systems that are powered from an AC main.

FIG. 11 illustrates parts of an exemplary linear regulator 1100 according to an embodiment of the present disclosure. As shown in FIG. 11, two high-current linear voltage regulators 1101, 1102 are connected in parallel, with the ability to handle currents as large as 10 amperes. A resistor network 1103 scales the voltage produced by the solar panel(s) down to the appropriate level to charge the battery and keep it charged during the times the solar panels are getting sunlight. The appropriate level of charge on the battery depends on the temperature of the battery, therefore the resistor network 1103 includes a temperature-sensing thermistor 1104 that alters the charge level in accordance with the temperature inside the enclosure to ensure the proper charge on the battery without over or under-charging it. The load burden on the two linear regulators 1101, 1102 is balanced by low value load balancing resistors 1105, 1106 implemented, for example, by appropriate design of the size and length of the copper traces on the circuit board.

A comparator circuit 1107 continually monitors the battery voltage and disconnects the load (the monitor system) if the battery voltage goes below a safe minimum level. This protects the battery from damage that would occur if it became excessively depleted. The battery would only get depleted if the solar panels did not get enough sunlight (for example due to overcast weather) for a long period of time, typically several days. When power is restored, the solar panels will charge the battery again. The comparator circuit 1107 keeps the load disconnected until the battery voltage rises, at which point the circuit 1107 reconnects the load. This ensures that the battery has regained enough charge to operate the system without damage. Two blocking diodes 1108 are provided to prevent battery current from flowing into the solar panel(s) during periods of low or no light.

According to the embodiment shown in FIG. 12, the charge controller includes circuitry 1200 to monitor the currents that are flowing from each of one or two solar panels and flowing into the battery when charging and out of the battery when discharging. The circuitry 1200 converts the current flow into a proportional analog voltage, measurable by a CPU ADC. Very low-value current-sensing resistors 1201 are implemented on the circuit board, for example, by appropriate design of the size and length of the copper traces. A 6-pin connector 1202 delivers the analog voltages to the main analog board via a cable. Because of the limited number of ADC channels, only the battery charge-discharge signals are routed to the CPU on the main board.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A system for earthquake detection comprising:
   a plurality of sensing stations that collect data used for earthquake detection, each sensing station comprising:
      a plurality of induction magnetometer sensors configured to detect changes in local magnetic fields;
      a plurality of ion sensors configured to detect local ion levels;
      a CPU to sample data detected by the magnetometer sensors and ion sensors, to manage the collection of the sampled data into data packets, each data packet tagged with the time stamp of the collection and stored at the sensing station, and to collect status information for the sensing station; and
   a data center to collect and evaluate data from the plurality of sensing stations;
   wherein infrared data is collected for a region surrounding each sensing station, the infrared data indicates a slope of a change in temperature at night for the region;
   wherein the magnetometer data and ion level data collected at each sensing station is evaluated at the data center to eliminate known noise signals;
   wherein the probability of a forthcoming earthquake within the next 24-48 hours increases if one or more of the following conditions is met:
      the infrared data has a positive slope indicating an increase in nighttime temperature, after correcting for change in cloud cover;
      a current count of unipolar pulses detected within unipolar pulse data collected for the most recent two weeks, with noise pulses eliminated, has a current ranking number higher than previous ranking numbers for previous counts of unipolar pulses detected within the unipolar pulse data collected for a two-week period leading up to a known earthquake, wherein each count is assigned a ranking number that is derived by comparing the current count to the previous counts and the count with the highest value has the highest ranking, with noise pulses eliminated;
      the level of ions detected within the ion level data collected for the most recent two weeks, with noise eliminated, is greater than the average level in a plurality of two-week historical levels, with noise eliminated, within a predetermined number of preceding days; and
      a pattern of the magnitude and timing of the detected unipolar pulses, ion data, and infrared slope data collected over the most recent two weeks matches a pattern of magnitude and timing of unipolar pulses, ion data, and infrared slope data previously collected during the two weeks leading up to a known occurrence of previous earthquakes.

2. The system of claim 1, further comprising a communication channel established between the data center and each sensing station, wherein the data center receives status information from each sensing station at regular intervals via the respective communication channel.

3. The system of claim 2, wherein the communication channel is a secure communication channel.

4. The system of claim 3, wherein the data center transfers the stored data packets from each sensing station via the secure communication channel using a loss-less file transfer protocol.

5. The system of claim 1, wherein the infrared data for a region surrounding each sensing station is collected by examining pixels corresponding to a 4 km×4 km space overlapping with the station from an infra-red satellite picture of the region.

6. The system of claim 1, wherein the magnetometer data contains a unipolar pulse where a detected waveform in the magnetometer data is 2-3 standard deviations higher than the average of the magnetometer data, the waveform has a rise time on the leading edge longer than 3-5 samples when samples are taken at 50 samples per second, and the waveform has a duration longer than 500 milliseconds.

7. The system of claim 1, wherein eliminating known noise signals comprises comparing a detected magnetic pulse to a known noise set and if there is a match between the detected pulse and any pulse in the set, then the detected pulse is attributable to a known noise source.

8. The system of claim 1, wherein each sensing station further comprises a relative humidity sensor and evaluating the ion level data further comprises evaluating a relative humidity at the respective station, and ignoring the collected ion level data when both the detected relative humidity is above a predetermined threshold and when the ion sensor regularly saturates.

9. The system of claim 1, wherein, based on information received as part of the status information, the data center transmits instructions to an associated sensing station to adjust performance of the sensing station.

10. The system of claim 1, wherein a sensing station further comprises:
    a solar panel; and
    a charge controller to manage the use by the sensing station of solar energy collected by the solar panel;
    wherein the charge controller uses only linear, non-switching circuitry.

11. A method for detecting the probability of a forthcoming earthquake comprising:
    collecting data from a plurality of sensing stations, the data used for earthquake detection, said collecting comprising:
       detecting unipolar pulse data as changes in local magnetic fields with a plurality of induction magnetometer sensors;
       detecting local ion level data with a plurality of ion sensors;
       sampling the detected unipolar pulse data and ion level data with a CPU to provide sampled sensor data;
       managing the collection of sampled sensor data into data packets with the CPU, each data packet tagged with a unique time stamp of the collection; and
       storing the data packets in a memory;
    transmitting the collected data packets to a remote data center;

collecting infrared data for a region surrounding each sensing station, the infrared data indicating a slope of a change in temperature at night for the region;

evaluating the unipolar pulse data and the ion level data collected at each sensing station to eliminate known noise signals from the collected data; and collecting and evaluating status information at the data center for each sensing station by receiving status information from each sensing station at regular intervals via a communication channel;

wherein the probability of a forthcoming earthquake within the next 24-48 hours increases in response to one or more of the following conditions:

the infrared data has a positive slope indicating an increase in nighttime temperature, after correcting for change in cloud cover;

a current count of unipolar pulses detected within unipolar pulse data collected for the most recent two weeks, with noise pulses eliminated, has a current ranking number higher than previous ranking numbers for previous counts of unipolar pulses detected within the unipolar pulse data collected for a two-week period leading up to a known earthquake, wherein each count is assigned a ranking number that is derived by comparing the current count to the previous counts and the count with the highest value has the highest ranking, with noise pulses eliminated;

the level of ions detected within the ion level data collected for the most recent two weeks, with noise eliminated, is at least one standard deviation greater than the average level in a plurality of two-week historical levels, with noise eliminated, within a predetermined number of preceding days; and a two-week pattern of the magnitude and timing of the detected unipolar pulses, ion data, and infrared slope data matches a pattern of magnitude and timing of unipolar pulses, ion data, and infrared slope data previously collected during the two weeks leading up to the occurrence of previous earthquakes.

12. The method of claim 11, wherein collecting the infrared data for a region surrounding each sensing station further comprises examining pixels corresponding to a 4 km×4 km space overlapping with the station from an infrared satellite picture of the region.

13. The method of claim 11, wherein the magnetometer data contains a unipolar pulse where a detected waveform in the magnetometer data is 2-3 standard deviations higher than the average of the magnetometer data, the waveform has a rise time on the leading edge longer than 3-5 samples, when samples are taken at 50 samples per second, and the waveform has a duration longer than 500 milliseconds.

14. The method of claim 11, wherein eliminating known noise signals from the collected data further comprises:

comparing a pulse detected by a magnetometer to a known noise set;

attributing the detected pulse to a known noise source when there is a statistical match between the detected pulse and any pulse in the noise set.

15. The method of claim 11, wherein evaluating the ion level data further comprises:

evaluating a relative humidity at the respective sensing station with a humidity sensor; and ignoring collected ion level data when the relative humidity is above a predetermined threshold and the ion sensor is demonstrating routine saturation.

16. The method of claim 11, further comprising transmitting the data packets from the respective sensing station to the data center via a secure communication channel using a loss-less file transfer protocol.

17. The method of claim 11, further comprising transferring, from the data center, instructions to a sensing station to adjust performance of the sensing station based on information received as part of the status information at the data center.

18. The method of claim 11, further comprising:

managing, at a sensing station, the use of solar data collected by a solar panel with a charge controller;

wherein the charge controller uses only linear, non-switching circuitry.

* * * * *